United States Patent [19]

Malaviya

[11] 3,789,301
[45] Jan. 29, 1974

[54] METHOD AND APPARATUS FOR MEASURING THE PARAMETERS OF A TRANSISTOR OR OTHER TWO-PORT DEVICE AT MICROWAVE FREQUENCIES

[75] Inventor: Shashi Dhar Malaviya, Fishkill, N.Y.

[73] Assignee: International Business Machines Corporation, Armonk, N.Y.

[22] Filed: Dec. 30, 1971

[21] Appl. No.: 214,132

[52] U.S. Cl............................ 324/158 T, 324/58.5 B
[51] Int. Cl......................... G01r 31/26, G01r 27/04
[58] Field of Search 324/158 T, 158 D, 158 R, 58.5 B

[56] References Cited
UNITED STATES PATENTS

| | | | |
|---|---|---|---|
| 3,622,883 | 11/1971 | Haire | 324/158 T |
| 3,025,463 | 3/1962 | Luoma et al. | 324/58.5 B |
| 3,211,999 | 10/1965 | Allerton et al. | 324/58.5 B |
| 3,500,204 | 3/1970 | Stromer | 324/158 T |
| 3,668,522 | 6/1972 | Ghafghaichi | 324/158 T |

OTHER PUBLICATIONS

Transistor Parameter Measurements, Hewlett-Packard Application Note 77-1, Jan. 1967.

Adam et al., Broadband Passive ..., Hewlett–Packard Journal, Jan. 1969, pp. 1–10.
Bauhaus, R. H., "Measuring High–Frequency. . .", Hewlett–Packard Journal, Jan. 1969, pp. 11–14.

Primary Examiner—Alfred E. Smith
Assistant Examiner—Ernest F. Karlsen
Attorney, Agent, or Firm—Martin G. Reiffin

[57] ABSTRACT

A first sinusoidal signal at a microwave frequency is applied to the input port of a transistor while simultaneously therewith a second sinusoidal signal at the same frequency is applied to the output port. The magnitude and phase of the signals are adjusted to effect successively short-circuit and open-circuit conditions at the input and output ports. For each condition the magnitudes and phases of the incident and reflected waves are measured or determined at the ports. These measurements may then be used to compute four of the usual transistor parameters and to check the self-consistency of the measurement. A second set of measurements may then be made at a different microwave frequency to compute additional transistor parameters. The beta of the transistor may be directly measured at either microwave frequency.

38 Claims, 13 Drawing Figures

METHOD AND APPARATUS FOR MEASURING THE PARAMETERS OF A TRANSISTOR OR OTHER TWO-PORT DEVICE AT MICROWAVE FREQUENCIES

BACKGROUND OF THE INVENTION

1. Field of the Invention

This invention relates to the measurement of the parameters of a transistor or other two-port device, and more particularly, to the measurement of such parameters at microwave frequencies in the range of about 0.1 GHz to 10 GHz.

1. Description of the Prior Art

In the prior art techniques for the measurement of the parameters of a transistor or other two-port device at microwave frequencies (above about 0.1 GHz), two major difficulties arose. First, the terminals of the device were not directly accessible. Between the device terminals and the measuring instruments there were parasitic elements and transmission lines due to the package structure, the mounting jig and the leads. As a result, the measurements had to be made at the accessible external terminals and then referred back to the device terminals by suitable computations which were difficult and often led to inaccuracies.

Second, it was necessary to provide accurate impedance terminations required to establish open-circuit and short-circuit conditions at the input and output ports for the measurement of $h$, $y$ or $z$ parameters. Lead inductance and capacitance as well as the loading effects of the measuring instruments made such terminations impossible to achieve at microwave frequencies.

These difficulties were obviated with the recent introduction of the vector voltmeter technique for measuring so-called "scattering" or $s$ parameters which are reflection and transmission coefficients of the electrical waves incident to the input and output ports. With this apparatus a standard 50-ohm impedance is provided for both the source and the load and the terminations are maintained accurate of microwave frequencies. Furthermore, the s-parameter technique provides gain and stability measurements which can be made insensitive to header parasitics and reference plane location so that the measurements are approximately the same for the bare chip as for the packaged device.

However, the s-parameter technique is disadvantageous in three respects. First, the measurements are made with only the single 50-ohm terminations at the input and output ports so that no measurements with both open-circuit and short-circuit terminations are obtained. As a result, only one set of four measurements is provided for computation of the device parameters, and there is no second set of four redundant measurements to provide a check on the accuracy of the single set of four measurements, as is the case with the prior art technique of open-circuit and short-circuit measurements.

Second, the s-parameter technique does not provide a direct measurement of "beta," the most important transistor parameter at the high frequencies. Instead, with the s-parameter technique it is necessary to compute the beta parameter (which refers to a short-circuit condition at the output terminals) from measurements made under matched load conditions, typically 50 ohms.

Third, the s-parameter technique provides measured data from which it is possible to compute the values of more than four transistor parameters only with considerable mathematical complexity, difficulty and likelihood of inaccuracy.

Another prior art technique for the measurement of transistor parameters at microwave frequencies is disclosed in U.S. Pat. No. 3,054,948 to E. J. Rymaszewski and assigned to the assignee of the present application. This patent discloses a method wherein an electrical sinusoidal signal is applied simultaneously to the input and output terminals of a transistor. The amplitude and phase of the signal applied to the output terminals are adjusted to effect an open-circuit at the output terminals. The ratio of the current or voltage present at the output terminals to the current or voltage present at the input terminals is measured to provide a transfer characteristic. The patent also discloses adjustment of the amplitude and phase of the signal applied to the output terminals to effect a short-circuit condition at the output terminals, and measurement of the desired currents or voltages at the respective terminals.

The method of said U.S. Pat. No. 3,054,948 is disadvantageous in several respects as compared with the method of the present invention. First, this prior art technique does not provide short-circuit or open-circuit conditions directly at the terminals of the transistor; instead, these conditions are effected only at the terminals of the socket, jig or other device on which the transistor is mounted. Second, this prior art technique does not use standard laboratory equipment such as the s-parameter vector voltmeter apparatus and dual directional couplers utilized in the technique in accordance with the present invention. Third, this prior art method does not provide measurement of the incident and reflected waves constituting the signals going into and coming out of the respective ports of the device being tested. Fourth, this prior art technique does not account for the reactances of the leads connecting the transistor to the mounting jig and connecting the latter to the measuring meters.

SUMMARY OF THE INVENTION

It is therefore a primary object of the present invention to provide a novel method and apparatus for measuring the microwave parameters of a transistor or other two-port device, which method and apparatus combine the various advantages of the prior art techniques discussed above but which obviate the disadvantages thereof.

A further object of the present invention is to provide a novel technique for the measurement of microwave parameters which technique provides redundant measurements so as to enable one to check the self-consistency of the measured data at any single frequency.

Another object of the invention is to provide a novel measurement technique which, by repeating the measurements at appropriate frequency intervals, enables one to evaluate a transistor model having more than four elements and to construct a piece-wise approximation to the device characteristics over a wide range of frequencies, provided that the elements of the transistor model remain linear throughout the range and are slowly and smoothly varying functions of frequency. The last conditions are ensured in practice by using seven complex elements in the transistor model instead of only four, as is the practice in the prior art.

Still another object of the invention is to provide a novel technique for the measurement of transistor parameters at microwave frequencies which provides greater accuracy and reproducibility of the results as compared with the prior art techniques which usually require extrapolation of lower frequency measurements to higher frequencies.

A further object of the invention is to provide a novel technique for the measurement of all the important high-frequency transistor parameters, including beta and base resistance, and which uses standard s-parameter measuring equipment with coaxial cables for use in the 0.1 to 10 GHz range.

The present method is based on a combination of the s-parameter measurements, which are the best for frequencies above 0.1 GHz, and the open-circuit and short-circuit measurements, which are the best at the lower frequencies. The present method combines the most desirable practical features of the s-parameter measurements with the mathematical simplicity of the usual open-circuit and short-circuit measurements.

If the reflection coefficient is measured at the input of a transistor by using the s-parameter method, its value is some complex number other than +1 or −1 because the input impedance of a transistor is finite. However, the reflection coefficient can always be made equal to +1 or −1, as desired, by applying signals to both the input and output terminals simultaneously. This is the basis of the present method. When the reflection coefficient is adjusted to +1, an effective open-circuit exists at the transistor terminals, and when the reflection coefficient is adjusted to −1, an effective short-circuit condition exists at the terminals. The desired reflection coefficient is obtained by adjusting the relative magnitudes and phases of the signals applied simultaneously to the input terminals and output terminals of the transistor or other device being tested.

Using the technique in accordance with the present invention, one can measure the input impedance of the transistor or other two-port device by measuring the input incident and reflected waves with the output short-circuited or open-circuited. The output short-circuit current or open-circuit voltage can be calculated by measuring either the incident wave or reflected wave at −output. Since the input voltage is also calculated from the input incident and reflected wave measurements, the transconductance or transfer admittance of the transistor or other device is readily obtained. The output impedance and reverse transconductance are measured in a similar manner by generating an effective open-circuit or short-circuit condition at the input terminals.

One of the main reasons for resorting to s-parameter measurements at the higher frequencies is the lack of instruments which can measure open-circuit voltages and short-circuit currents without affecting adversely the operation and terminal conditions of the circuit being tested. Another reason for utilization of s-parameter measurements at the higher frequencies is the problem of physical access to the true imput and output terminals of the device being tested. Even the shortest physical lengths of connecting wires alter the instrument readings drastically, particularly at frequencies above 0.5 GHz.

These problems have been overcome in the present method by using the standard s-parameter measuring equipment and by generating effective open-circuits and short-circuits deep inside the totally shielded transistor jig by utilizing only externally applied signals. By using a novel calibration procedure, the true open-circuit voltages and the true short-circuit currents prevailing across the actual terminals of the device being measured can be inferred from the measurement of incident and reflected waves at the regular ports of the associated directional couplers.

The above-described objects and advantages of the present invention are achieved as follows. The directional couplers are first calibrated to determine the losses and phase shifts of signals transmitted therethrough in both directions. The transistor jig is then calibrated with the transistor removed to determine the losses and phase shifts for the open-circuit condition at both the input and output ports. A conductor is then mounted in the jig so as to short-circuit the input terminal to the output terminal and the jig is calibrated to determine the losses and phase shifts for signals transmitted through the jig is both directions.

The transistor or other two-port device to be measured is then mounted in the jig and a sinusoidal signal at a microwave frequency is applied to the input port of the jig while simultaneously the signal is applied to the output port. The relative magnitudes and phases of the signals at the input and output ports are adjusted to effect successively short-circuit and open-circuit conditions at the input and output ports as determined during the calibration procedure. For each condition, the magnitude and phase of the incident and reflected waves are measured or determined at the ports.

These measurements may then be used to compute four of the usual transistor parameters. A second set of measurements may then be made at a different microwave frequency to compute additional transistor parameters. The beta of the transistor may be directly measured at either microwave frequency.

The foregoing and other objects, features and advantages of the invention will be apparent from the following more particular description of the preferred embodiment of the invention as illustrated in the accompanying drawings.

DESCRIPTION OF THE PREFERRED EMBODIMENT

Apparatus

Figure 1:
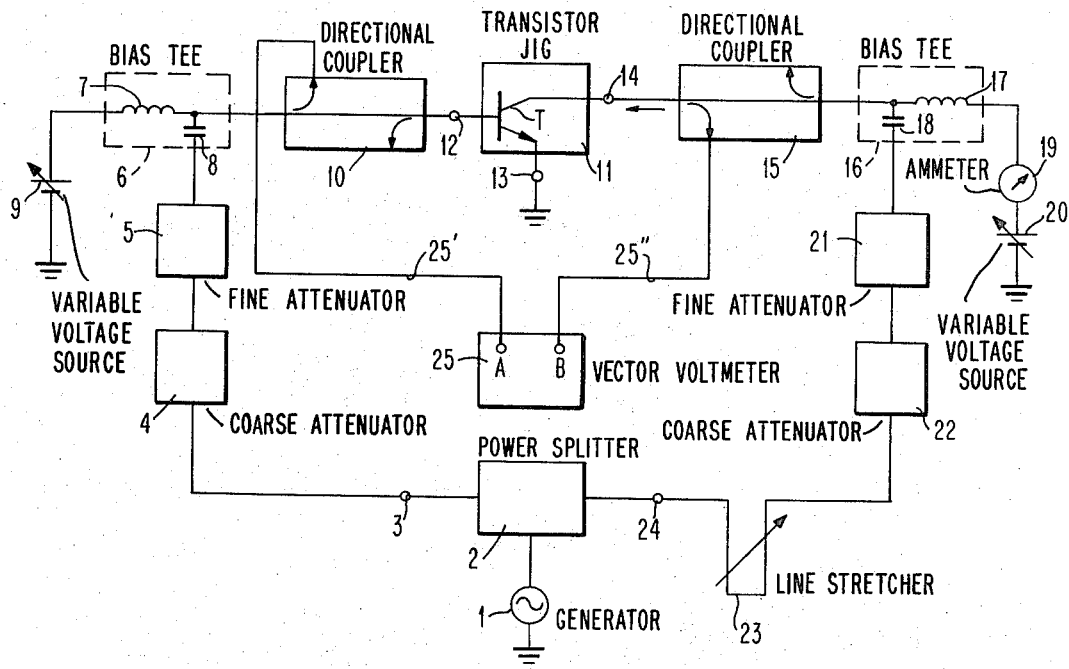
FIG. 1 is a schematic diagram showing the arrangement of the apparatus in accordance with the present invention.

Referring first to FIG. 1, there is shown the apparatus for making the measurements in accordance with the method of the present invention. A generator 1 is provided for generating sinusoidal signals at any microwave frequency from 0.1 to 10 GHz. The generator 1 is connected to a power splitter 2 having a first output terminal 3 connected to a coarse attenuator 4 connected in series with a fine attenuator 5 in turn connected to one of the ports of a bias tee 6. The latter comprises in effect an inductor 7 extending from one port and connected to a capacitor 8 extending from the port connected to fine attenuator 5. A variable direct-current voltage source 9 is connected to the port of bias tee 6 from which inductor 7 extends. The third port of bias tee 6 is connected to one end of a directional coupler 10 having its other end connected to the input terminal 12 of a transistor jig 11 for mounting a transistor T or other two-port device to be tested. The base of transistor T is connected to terminal 12, the emitter of transistor T is connected to grounded terminal 13 of jig 11, and the collector of transistor T is connected to terminal 14 of jig 11.

Terminal 14 of transistor jig 11 is connected to one end of a directional coupler 15 having its other end connected to one of the ports of a bias tee 16 comprising in effect an inductor 17 extending from a second port and a capacitor 18 extending from a third port. The second port of bias tee 16 is connected to an ammeter 19 in turn connected to a variable direct-current voltage source 20. The third port of bias tee 16 is connected to a fine attenuator 21 connected in series with a coarse attenuator 22 in turn connected to a line stretcher 23. The latter is connected to the second terminal 24 of power splitter 2. A vector voltmeter 25 is shown with its probe A lead 25' connected to a port of directional coupler 10 and its probe B lead 25'' connected to a port of coupler 15.

Power splitter 2 may be Hewlett Packard type 11549A. Bias tees 6 and 16 may be General Radio type 874-FBL Bias Insertion Units. Directional couplers 10 and 15 may be Hewlett Packard type 778D Dual Directional Couplers. Transistor jig 11 may be type TF-070 manufactured by the Avantek Company and is shown in detail in FIG. 13. Line stretcher 23 may be a General Radio type 874-LTL Trombone Constant-Impedance Adjustable Line. Vector voltmeter 25 is Hewlett Packard type 8405A.

Figure 13:
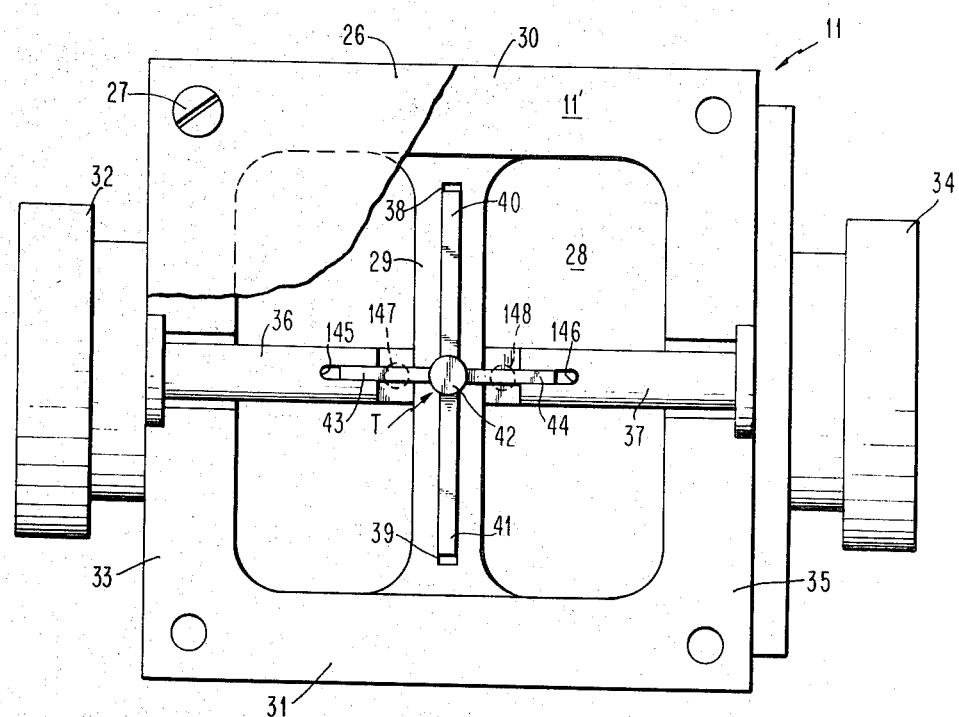
FIG. 13 is a plan view of the jig for mounting the transistor.

Referring to FIG. 13, transistor jig 11 comprises a casing 11' normally closed by a cover plate 26 secured by screws 27. Cover plate 26 is shown broken away. Casing 11' is formed with a substantially square hollow interior 28 across which extends a vertical rib 29 extending from an upper casing wall 30 to a lower casing wall 31. A coaxial socket 32 is formed on the left-hand wall 33 of casing 11', and a coaxial socket 34 is similarly formed on the right-hand wall 35 of casing 11'. A cylindrical conductor 36 extends through left-hand casing wall 33 from socket 32, and a cylindrical conductor 37 extends through right-hand casing wall 35 from socket 34. Socket 32 constitutes the base port of jig 11 and socket 34 constitutes the collector port of jig 11.

Rib 29 is provided with longitudinal slots 38, 39 for receiving the ground leads 40, 41 extending radially from the body portion 42 of transistor T. Transistor T is further provided with a base lead 43 and a collector lead 44 which are received respectively within horizontally extending grooves 145, 146 formed in cylindrical conductors 36, 37. The dashed-line circles 147, 148 designate two pins secured to the lower surface of cover plate 26 and which press upon base and collector leads 43, 44 to urge the latter into good electeical contact with cylindrical conductors 36, 37.

Theory and Basic Equations

Figure 2:
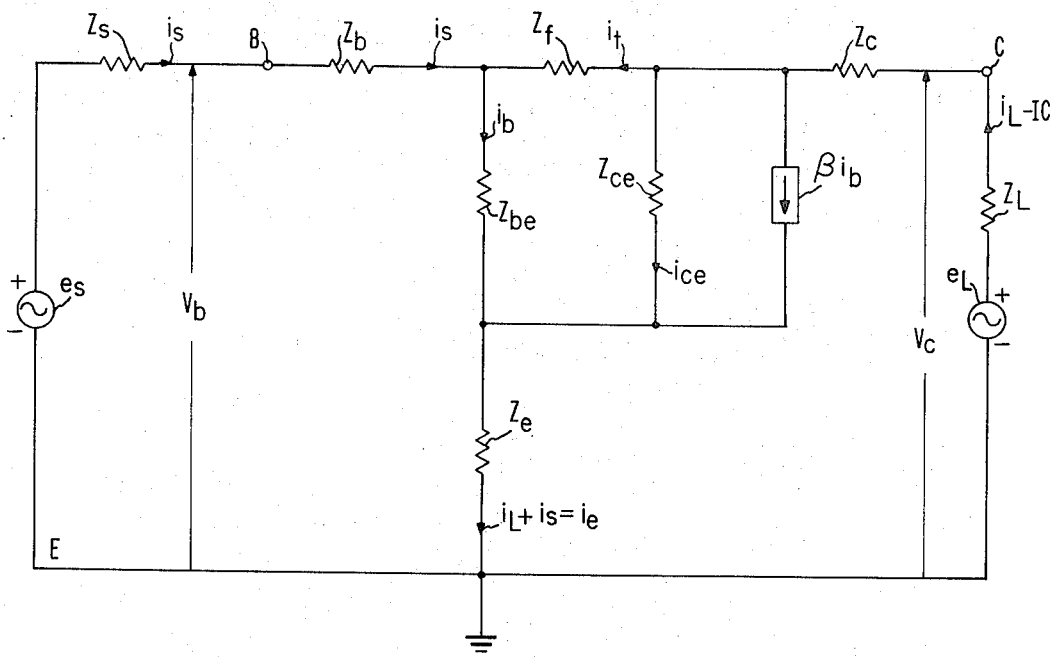
FIG. 2 is a circuit diagram showing an equivalent circuit for a transistor at microwave frequencies.

To derive the a.c. parameters of the transistor from the above measurements, one may use the 7-element transistor model shown in FIG. 2. The following definitions are employed:

$$Z \equiv Z_{be} + Z_f + (\beta + 1) Z_{ce} \quad (1a)$$

$$Z_1 \equiv Z_b + Z_{be} Z_f/Z = V_B/i_s] \ i_e = 0 \quad (1b)$$

$$Z_1 \equiv Z_e + Z_{be} Z_{ce}/Z = V_B/i_e] \ i_s = 0 \quad (1c)$$

$$Z_3 \equiv Z_c + Z_f Z_{ce}/Z = V_C - V_B/i_e \ ] \ i_s = 0 \quad (1d)$$

$$Z_4 \equiv \beta Z_{ce} Z_f/Z = V_B/i_e] \ i_s = 0 - V_C/i_s] \ i_L = 0 \quad (1e)$$

$$X \equiv i_e/i_b = 1 + i_L/i_s \quad (1)$$

$$Z_{in} \equiv V_B/i_s = Z_1 + xZ_2 \quad (2)$$

$$Z_T \equiv V_C/i_s = x(Z_2 + Z_3) - (Z_3 + Z_4) \quad (3)$$

The following equations are derived from the theory of low loss transmission lines:

$$V_C = V_c^+ + V_c^-, \quad (4)$$

where $V_c7^+$ and $V_c^-$ are complex numbers representing the magnitudes and phases of the waves incident to and reflected from the transistor collector terminal.

$$V_B = V_b^+ + V_b^-,$$

where $V_b^+$ and $V_b^-$ are complex numbers representing the magnitudes and phases of the waves incident to and reflected from the transistor base terminal.

$$i_L = V_c^+ - V_c^-/Z_o \quad (5)$$

$$i_s = V_b^+ - V_b^-/Z_o$$

$$Z_{in} = V_b^+ + V_b^-/V_b^+ - V_s^- \; Z_o = 1 + \rho_{in}/1 - \rho_{in} \; Z_o \,,$$

where $Z_o$ ≡ transmission line impedance = 50 ohms and,
$\rho_{in}$ = reflection coefficient at the input port ≡ $V_b^-/V_b^+$ $$Z_{out} = V_c^+ + V_c^-/V_c^+ - V_c^- \; Z_o = 1 + \rho_{out}/1 - \rho_{out} \; Z_o \quad (6)$$

where $\rho_{out}$ = reflection coefficient at the output port ≡ $V_c^-/V_c^+$

Since the voltages are measured in the laboratory in dbm, the following relation is used to convert them into volts:

$$V = 1/\sqrt{20 \exp.(0.1151293 \vert m \vert)} \text{ volts}, \quad (7)$$

where $m$ = *the measured magnitude in dbm.*

The equation is valid for magnitudes below zero dbm, as is the case in practice in the laboratory measurements.

By applying these relations to the data obtained from the measurements, the values of $Z_1$ through $Z_4$ are obtained in the manner shown below.

Calibration of the Directional Couplers

Figure 3:
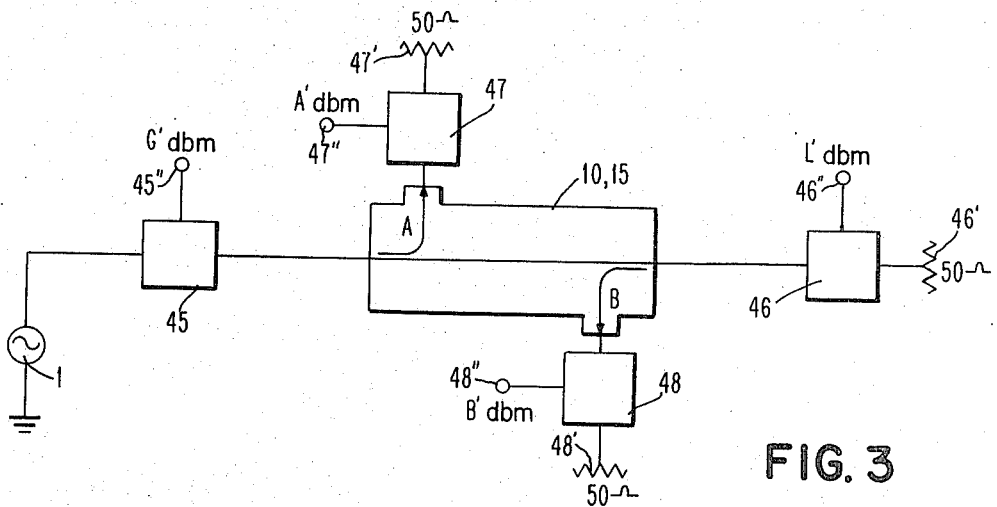
FIG. 3 is a schematic diagram showing the calibration of the directional coupler in the forward direction.
Figure 4:
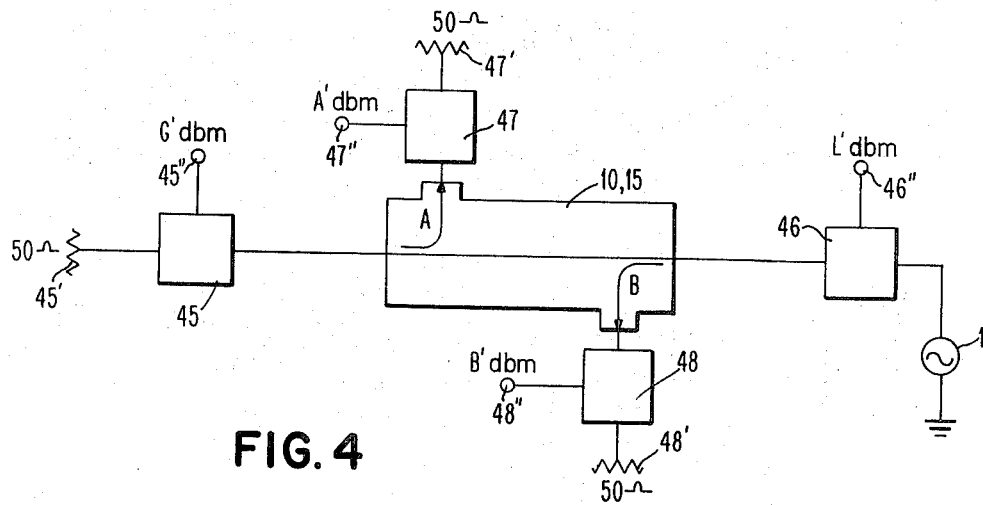
FIG. 4 is a schematic diagram showing the calibration of the directional coupler in the reverse direction.

In FIGS. 3 and 4 there are shown schematically the arrangements for calibrating directional couplers 10, 15; that is, for determining the losses and also the port coupling coefficients of each coupler 10, 15. FIG. 3 shows the determination of the forward loss and also the coupling coefficient of port A, and FIG. 4 shows the determination of the reverse loss and also the coupling coefficient of port B.

In FIG. 3 the output of generator 1 is connected through a tee 45 to the input port of coupler 10, 15. The output port of the latter is connected through a tee 46 to a 50-ohm termination 46'. Ports A and B of each coupler 10, 15 are similarly connected to tees 47, 48 respectively, and each of the latter is connected to a 50-ohm termination indicated at 47', 48'. Tees 45, 46, 47, 48 may be Hewlett Packard Type 11536A.

Generator 1 is adjusted to generate a sinusoidal signal at the desired microwave frequency. Probe A of vector voltmeter 25 is applied to port 45'' of tee 45 and then to port 47'' of tee 47 to obtain respective readings of G' dbm for the input signal to coupler 10, 15 and A' dbm for the signal tapped off at port A. Probe A of voltmeter 25 is then applied to port 46'' of tee 46, and a reading of L' dbm is obtained for the output signal from coupler 10, 15.

The forward loss in coupler 10, 15 is:

$$F = G' - L' \text{ db}$$

The coupling coefficient for port A is:

$$A = G' - A' \text{ db}$$

In FIG. 4 the output of generator 1 is connected to tee 46 and a 50-ohm termination 45' is connected to tee 45. In a manner similar to that described above with respect to FIG. 3, the reverse loss in each coupler 10, 15 is determined to be $$R = L' - G' \text{ db}$$

and the coupling coefficient of port B is $$B = L' - B' \text{ db}$$

Open-circuit Calibrations

Figure 5:
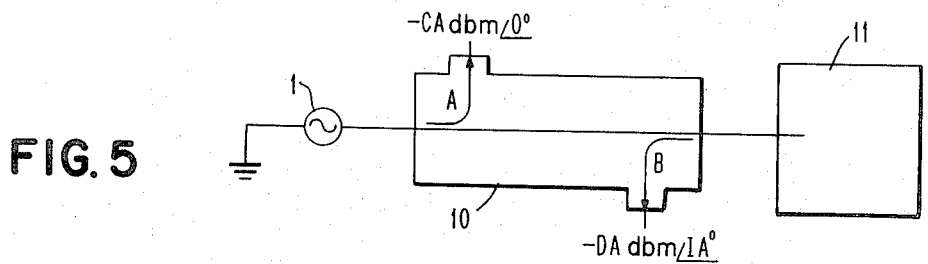
FIG. 5 is a schematic diagram showing the calibration of the jig with an open-circuit condition at the input port.

With transistor T removed from jig 11 (FIGS. 5 and 6), the incident and reflected waves at the ports A and B of couplers 10, 15 are recorded as follows:
1. Probe A connected to port A of coupler 15: $V_c^+$ = $-AA$ dbm; 0°
2. Probe B connected to port B of coupler 15: $V_c^-$ = $-BA$ dbm; GA°
3. Probe A connected to port A of coupler 10: $V_b^+$ = $-CA$ dbm; 0°
4. Probe B connected to port B of coupler 10: $V_b^-$ = $-DA$ dbm; IA°

Figure 6:
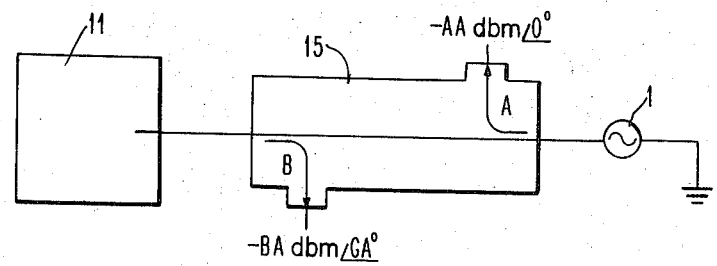
FIG. 6 is a schematic diagram showing the calibration of the jig with an open-circuit condition at the output port.

$V_c^+$ represents the magnitude and phase of the wave travelling from right to left in FIG. 6 and incident to the collector port 34 of jig 11. $V_c^-$ represents the magnitude and phase of the wave travelling from left to right in FIG. 6 and reflected from the collector port 34 of jig 11. $V_b^+$ represents the magnitude and phase of the wave travelling from left to right in FIG. 5 and incident to the base port 32 of jig 11. $V_b^-$ represents the magnitude and phase of the wave travelling from right to left in FIG. 5 and reflected from the base port 32 of jig 11.

If the transistor is now mounted in the jig and generator 1, line stretcher 23 and the attenuators 4, 5, 21, 22 are readjusted to obtain an output reflection coefficient of $-(BA-AA)$ db, GA° i.e., the same as in the above case, an effective open circuit will exist across the transistor output terminals. The input impedance and other parameters measured under these conditions will therefore correspond to the open-circuit case. Similarly, the apparatus may be adjusted to obtain an input reflection coefficient of $-(DA-CA)$ db, IA° to provide an effective open-circuit across the transistor input terminals. Effective short-circuit conditions are provided by respective reflection coefficients equal in magnitude but displaced 180° in phase with reference to the reflection coefficients for the open-circuit conditions.

Transfer Calibrations

Figure 7:
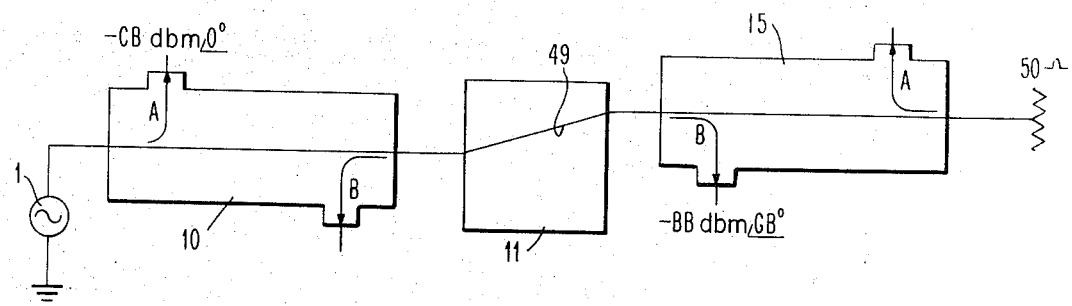
FIG. 7 is a schematic diagram showing the transfer calibration of the jig in the forward direction.
Figure 8:
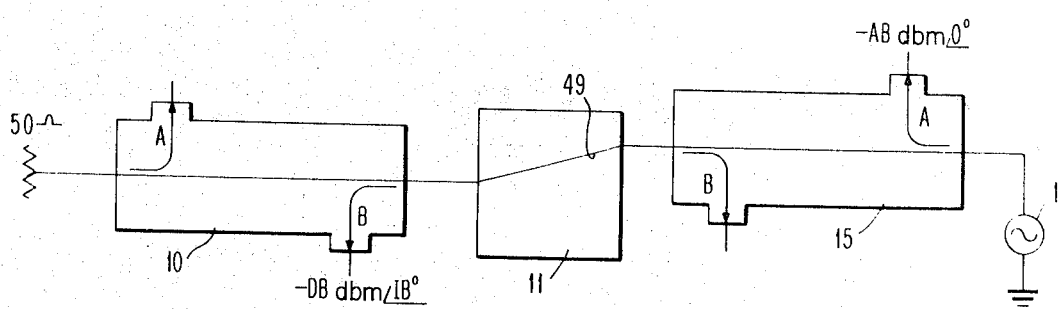
FIG. 8 is a schematic diagram showing the transfer calibration of the jig in the reverse direction.

As shown in FIGS. 7 and 8, the input and output terminals of jig 11 are connected by a direct metallic link 49.

In FIG. 8 the signal is applied to the output terminal and the input is terminated into 50 ohms. The reverse transfer characteristics are noted as follows:
1. Probe A connected to port A of coupler 14: $V_c^+$ = $-AB$ dbm, 0°
2. Probe B connected to port B of coupler 10: $V_b^-$ = $-DB$ dbm, IB°

Next, the signal is applied to the input terminal as shown in FIG. 7 and the output is terminated into 50 ohms. The forward transfer characteristics are noted as follows:
3. Probe A connected to port A of coupler 10: $V_b^+$ = $-CB$ dbm, 0°
4. Probe B connected to port B of coupler 15: $V_c^-$ = $-BB$ dbm, GB°

If the transistor is now mounted in the jig and similar readings are noted again, the difference between the two would be due to the transistor. For example, with the same $V_b^+$ as in step 3, if $V_c^-$ in step 4 increases by +6db; 40°, the forward insertion gain of the transistor is 6db; 40°.

Device Measurements with the Output Short-Circuited

Figure 9:
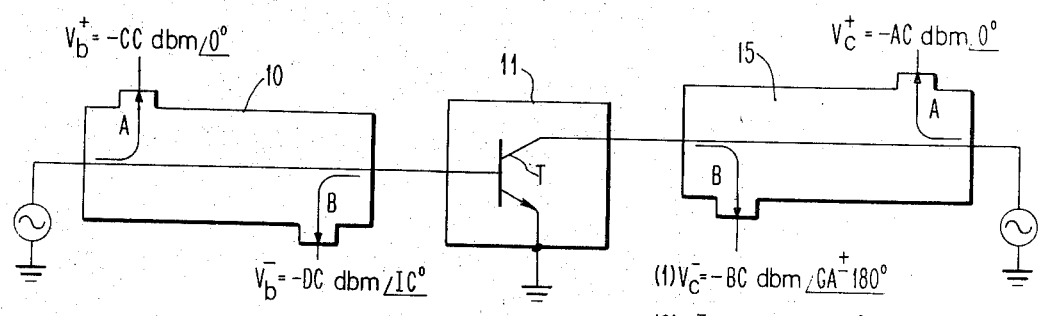
FIG. 9 is a schematic diagram showing device measurements with a short-circuit condition at the output port.

The transistor is mounted in jig 11 and the apparatus is arranged as shown in FIG. 1. Signals at a selected microwave frequency are now applied to both input and output ports simultaneously. Their respective amplitudes and phases are adjusted so that $V_c^-$ reads (BA−AA) db less than $V_c^+$, with a phase angle of GA± 180°. Referring to FIG. 9, the measurements are recorded with the indicated connections of vector voltmeter 25 as follows:

1. Probe A connected to port A of coupler 15: $V_c^+ = -AC$ dbm; 0°
2. Probe B connected to port B of coupler 15: $V_c^- = -BC$ dbm; $GA \pm 180°$ The reference probe A is then shifted to port A of coupler 10 and the readings are recorded as follows:

3. Probe A connected to port A of coupler 10; $V_b^+ = -CC$ dbm; 0°
4. Probe B connected to port B of coupler 15: $V_c^- = -BC$ dbm; GC°
5. Probe B connected to port B of coupler 10: $V_b^- = -DC$ dbm; IC°

Device Measurements with the Output Open-circuited

Figure 10:
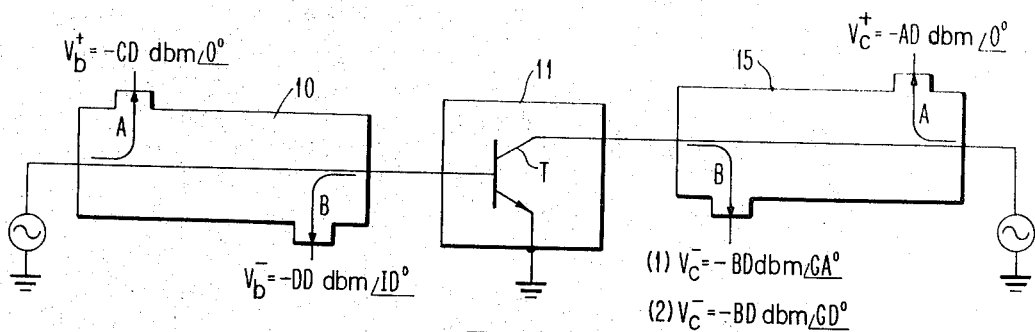
FIG. 10 is a schematic diagram showing device measurements with an open-circuit condition at the output port.

The procedure is the same as in the short-circuit case except that $V_c^-$ is adjusted to −(BA−AA) db, GA° with reference to $V_c^+$. Referring to FIG. 10, the readings are noted as follows:

1. Probe A connected to port A of coupler 15: $V_c^+ = -AD$ dbm; 0°
2. Probe B connected to port B of coupler 15: $V_c^- = -BD$ dbm; GA°
3. Probe A connected to port A of coupler 10: $V_b^+ = -CD$ dbm; 0°
4. Probe B connected to port B of coupler 15: $V_c^- = -BD$ dbm; GD°
5. Probe B connected to port B of coupler 10: $V_b^- = -DD$ dbm; ID°

Device Measurements with the Input Short-circuited

Figure 11:
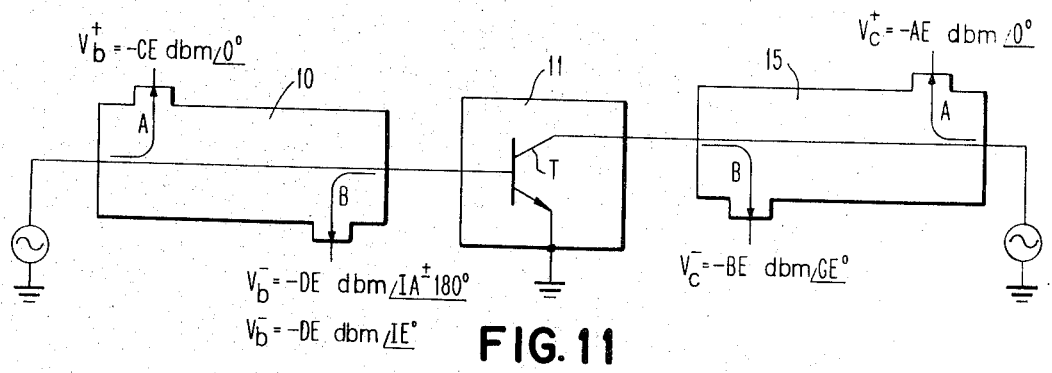
FIG. 11 is a schematic diagram showing device measurements with a short-circuit condition at the input port.

Referring to FIG. 11, $V_b^-$ is adjusted to −(DA−CA) db, IA±180° with reference to $V_b^+$ by manipulating the input signals. The readings are noted as follows:

1. Probe A connected to port A of coupler 10: $V_b^+ = -CE$ dbm; 0°
2. Probe B connected to port B of coupler 10: $V_b^- = -DE$ dbm; IA± 180°
3. Probe A connected to port A of coupler 15: $V_c^+ = -AE$ dbm; 0°
4. Probe B connected to port B of coupler 15: $V_c^- = -BE$ dbm; GE°
5. Probe B connected to port B of coupler 10: $V_b^- = -DE$ dbm; IE°

Device Measurements with Input Open-circuited

Figure 12:
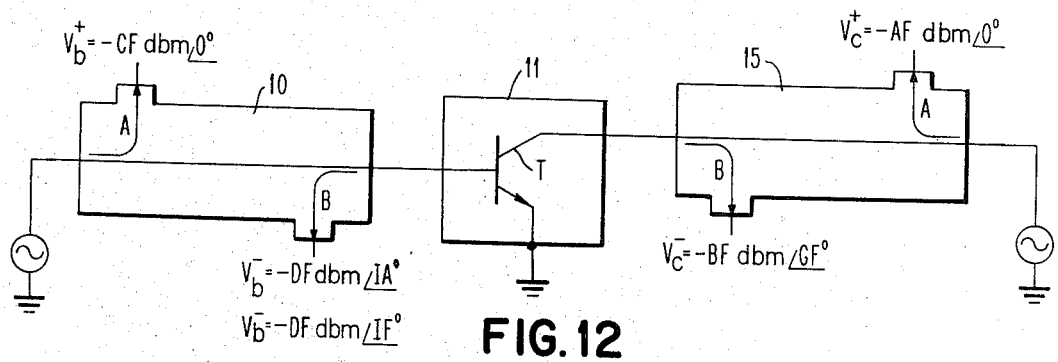
FIG. 12 is a schematic diagram showing device measurements with an open-circuit condition at the input port.

Referring to FIG. 12, $V_b^-$ is adjusted to −(DA−CA) db, IA° with reference to $V_b^+$ and the readings are noted as follows:

1. Probe A connected to port A of coupler 10: $V_b^+ = -CF$ dbm; 0°
2. Probe B connected to port B of coupler 10: $V_b^- = -DF$ dbm; IA°
3. Probe A connected to port A of coupler 15: $V_c^+ = -AF$ dbm; 0°
4. Probe B connected to port B of coupler 15: $V_c^- = -BF$ dbm; GF°
5. Probe B connected to port B of coupler 10: $V_b^- = -DF$ dbm; IF°

Calibration Corrections

1. With Short-circuit at the Output

1. To evaluate the true value of $V_b^+$ from the observed data: $V_b^+ = (-CC - F_{10} + A_{10})$ dbm /0°
2. To evaluate the true value of $V_b^-$ from the observed data:
$V_b^- = -(DC-CC-DA+CA)$ db /$(IC-IA)°$ with reference to $V_b^+$ so that:
$V_b^- = (-CC-F_{10} + A_{10} - DC + CC + DA - CA)$ dbm /$(IC-IA)°$
3. To evaluate the true value of $V_c^-$ from the observed data:
$V_c^- = (-BC + CC + BB - CB)$ db /$(GC-GB)°$ with reference to $V_b^+$ so that:
$V_c^- = (-CC - F_{10} + A_{10} - BC + CC + BB - CB)$ dbm / $(GC-GB)°$ 2. With Open-circuit at the Output 1. To evaluate the true value of $V_b^+$ from the observed data:
$V_b^+ = (-CD - F_{10} + A_{10})$ dbm / 0°
2. To evaluate the true value of $V_b^-$ from the observed data: $V_b^- = -(DD-CD-DA+CA)$ db /$(ID-IA)°$ with reference to $V_b^+$ so that:
$V_b^- = (-CD - F_{10} + A_{10} - DD + CD + DA - CA)$ dbm / $(ID-IA)°$
3. To evaluate the true value of $V_c^-$ from the observed data:
$V_c^- = (-BD + CD + BB - CB)$ db /$(GD-GB)°$ with reference to $V_b^+$ so that:
$V_c^- = (-CD - F_{10} + A_{10} - BD + CD + BB - CB)$ db /$(GD-GB)°$ 3. With Short-circuit at the Input 1. To evaluate the true value of $V_c^+$ from the observed data:
$V_c^+ = (-AE - R_{15} + A_{15})$ dbm /0°
2. To evaluate the true value of $V_c^-$:
$V_c^- = -(BE-AE-BA+AA)$ db /$(GE-GA)°$ with reference to $V_c^+$ so that:
$V_c^- = (-AE - R_{15} + A_{15} - BE + AE + BA - AA)$ dbm / $(BE-GA)°$
3. To evaluate the true value of $V_b^-$:
$V_b^- = (-DE + AE + DB - AB)$ db /$(IE-IB)°$ with reference to $V_c^+$ so that:
$V_b^- = (-AE - R_{15} + A_{15} - DE + AE + DB - AB)$ dbm /$(IE-IB)°$ 4. with Open-Circuit at the Input 1. To evaluate the true value of $V_c^+$ from the observed data:
$V_c^+ = (-AF - R_{15} + A_{15})$ dbm /0°
2. To evaluate the true value of $V_c^-$:
$V_c^- = -(BF - AF - BA + AA)$ db /$(GF=GA)°$ with reference to $V_c^+$ so that:
$V_c^- = (-AF - R_{15} - BF + AF + BA - AA)$ dbm / $(GF-GA)°$
3. To evaluate the true value of $V_b^-$:
$V_b^- = (-DF + AF + DB - AB)$ db / $(EF-IB)°$ with reference to $V_c^+$ so that:
$V_b^- = (-AF - R_{15} + A_{15} - DF + AF + DB - AB)$ dbm /$(IF-IB)°$

Calculations for Output Short-Circuited

For $V_C = 0$, equations (4) and (5) reduce to:

$$V_c^+ = -V_c^-$$
$$i_L = -2V_c^-/Z_o$$

Equation (3) reduces to:

$$x_c = Z_3 + Z_4/Z_2 + Z_3 = 1 + i_L/i_s \text{ by equation (1).} \quad (7a)$$

Hence, from equations (4) and (6):

$$x_c = 1 - 2V_c^-/V_b^+ - V_b^- = Z_3 + Z_4/Z_2 + Z_3 \quad (8)$$

From equations (2) and 7):

$$Z_{IN_c} \equiv V_B/i_s = Z_1 + x_c Z_2 = V_b^+ + V_b^-/V_b^+ - V_b^- Z_o \quad (9)$$

Equations (8) and (9) give two relations between the laboratory measurements and the four unknowns $Z_1$ through $Z_4$.

Calculations for Output Open-Circuited

For $i_c = 0$, we get:

$$V_c^+ = V_c^-$$

so that $$V_C = 2V_c^-$$
$$x_d \equiv 1 + i_c/i_s = 1.0$$

Hence, $$Z_{in} \equiv ZIND = Z_1 + xZ_2 = V_b^+ + V_b^-/V_b^+ - V_b^- Z_o \quad (10)$$

and $$Z_T \equiv ZTD = Z_2 - Z_4 = 2V_c^-/V_b^+ - V_b^- Z_o \quad (11)$$

Equations (10) and (11) give two more relations between the laboratory measurements and the four unknowns.

Calculations for Input Short-Circuited

For $V_B = V_b^+ + V_b^- = 0$, equation (2) gives $$x \equiv XE = -Z_1/Z_2 = 1 + i_L/i_s = 1 - V_c^+ - V_c^-/2V_b^- \quad (12)$$

Equation (3) can therefore be written as $$XE(Z_2 + Z_3) - (Z_3 + Z_4) = -V_c^+ + V_c^-/2V_b^- \quad (13)$$

Calculations for Input Open-Circuited

In this case, $V_b^+ = V_b^-$. Multiplying equations (2) and (3) by $i_s$ and then letting $i_s = 0$, we get:

$$V_B = 2V_b^- = i_L Z_2$$

so that $$Z_2 = 2V_b^-/V_c^+ = V_c^- \quad (14)$$

and $$V_C = i_L (Z_2 + Z_3)$$

so that $$Z_2 + Z_3 = V_C/i_L = V_c^+ + V_c^-/V_c^+ - V_c^- Z_o \equiv ZOUTF \quad (15)$$

Equations (12), (13), (14) and (15) provide four additional relations between the laboratory measurements and the four unknowns $Z_1$ through $Z_4$.

Evaluation of $Z_1$ through $Z_4$

Equations (8), (9), (10), (11), (12), (13), (14) and (15) provide eight equations for evaluating the four unknowns $Z_1$ through $Z_4$. The solutions may be worked out as follows:

Using equation (14):

$$Z_2 = -2V_b^-/V_c^+ - V_c^- ] i_s = 0$$

Using equation (10):

$$Z_1 = ZIND - Z_2$$

Using equation (15):

$$Z_3 = ZOUTF - Z_2$$

Using equation (11):

$$Z_4 = Z_2 - ZTD$$

The solutions are also obtained by using the remaining four equations as follows:

From equations (9) and (12):

$$Z_1 = ZINC/1 - (XC/XE)$$

and $$Z_2 = -Z_1/XE$$

From equations (7a) and (13):

$$ZTE = (Z_2 + Z_3)(XE - XC)$$

so that $$Z_3 = ZTE/(XE - XC) - Z_2$$

and $$Z_4 = XC(Z_2 + Z_3) - Z_3$$

Having determined the values of $Z_1$, $Z_2$, $Z_3$ and $Z_4$, one can then calculate from equations (1a) through (1e), four of the seven transistor parameters $Z_{be}$, $Z_f$, $\rho$, $Z_{ce}$, $Z_b$, $Z_c$ and $Z_e$, values for the remaining three parameters being assumed.

Measurements at a Second Frequency

As thus far described above, all measurements have been made at a single microwave frequency in the range of 0.1 to 10 GHz. These measurements enable one to compute four out of the seven transistor parameters designated in FIG. 2. By repeating the measurements at a different microwave frequency, a second set of equations is obtained which, together with the first set of equations set forth above, enable one to compute the values of the remaining three transistor parameters. These computations involve merely algebraic manipulations within the skill of the art.

However, the following approach leads to the evaluation of beta in its classical form and to overall simplicity in mathematical computations:

Use equation (1d) successively at the two frequencies to get:

$$Z_3 = Z_c + Z_4/\beta$$

and $$Z_3' = Z_c' + (Z_4'/\beta$$

where the unprimed symbols refer to the first frequency and the primed symbols refer to the second frequency.

Since $Z_3$, $Z_4$, $Z_3'$ and $Z_4'$ are known complex numbers, their values having been derived from the laboratory measurements as explained in the earlier parts of this disclosure, the above two complex equations have only two complex unknowns, namely beta and $Z_c$, it being assumed that $Z_c'$ and $\beta'$ can be expressed in terms of $Z_c$ and $\beta$ respectively, as functions of the two frequencies. These two equations therefore yield solutions for $Z_c$ and beta.

Two of the original seven (complex) unknown elements of the transistor model are thus evaluated. The mathematical complexity of the problem is now considerably reduced since we are left with only five unknowns, rather than seven.

Also, let beta be expressed in its classical form:

$$\beta = \beta_o\, e^{-j\omega\tau}/1+j(\omega/\omega_\beta)$$

where
$\beta_o$ = low frequency beta of the device.
$\tau$ = effective transit time of the minority carriers in the base region.
$\omega_\beta$ = beta cut-off frequency of the device.

The value of $\beta_o$ is evaluated in the conventional manner by independent measurements so that the expression for beta has only two real unknowns $\tau$ and $\omega_\beta$ and $\beta'$ can be evaluated simply by substituting $\omega'$ in place of $\omega$ in the equation for beta.

Beta, the most important high frequency parameter of the transistor can the be evaluated in its classical form.

Closed form mathematical solutions for the remaining five unknowns can be obtained by defining their frequency dependence on the basis of the physical structure of the transistor. For example, $Z_{ce}$ and $Z_f$ are generally assumed to be pure capacitances, $Z_{be}$, $Z_{ce}$ and $Z_c$ are assumed to be conductances shunted by capacitances and $Z_e$ is assumed to be an inductance in series with a resistance.

The frequency dependence of all the elements of the transistor model are thus defined to obtain closed form mathematical solutions.

Scope of the Invention

It is to be understood that the method and apparatus disclosed in the drawings and described above are merely illustrative of two of the many forms which the invention may take in practice and that numerous modifications thereof and other different embodiments will readily occur to those skilled in the art without departing from the scope of the invention delineated in the appended claims which are to be construed as broadly as permitted by the prior art.

I claim:

1. A method of measuring the electrical parameters of a transistor having two ports and comprising the steps of
    applying to the two ports respective electrical signals,
    adjusting the magnitude and phase of the signal at a port to effect a load condition of a predetermined impedance at one port,
    measuring the magnitude and phase of the signal at said one port, and
    measuring the magnitude and phase of the signal at the other port.

2. A method as set forth in claim 1 wherein
    said second-recited measuring step comprises measuring the magnitudes and phases of both the incident and reflected waves at said other port.

3. A method as set forth in claim 2 wherein
    said first-recited measuring step comprises measuring the magnitude and phase of the incident wave at said one port.

4. A method as set forth in claim 2 wherein
    said first-recited measuring step comprises measuring the magnitude and phase of the reflected wave at said one port.

5. A method as set forth in claim 1 wherein
    said electrical signals have a first frequency, and
    repeating said applying, adjusting and measuring steps with electrical signals of a second frequency different from said first frequency.

6. A method as set forth in claim 1 wherein
    said adjusting step comprises adjusting the magnitude and phase of the signal at a port to effect a short-circuit condition at one port.

7. A method as set forth in claim 1 wherein
    said adjusting step comprises adjusting the magnitude and phase of the signal at a port to effect an open-circuit condition at one port.

8. A method of measuring the electrical parameters of a transistor having two ports and comprising the steps of
    applying to the two ports respective electrical signals of the same microwave frequency,
    successivley adjusting the magnitude and phase of the incident wave at a port to effect successive load conditions each of a predetermined impedance at one port,
    measuring the magnitude and phase of the signal at said one port for each of said conditions, and
    measuring the magnitudes and phases of both the incident and reflected waves at the other port for each of said conditions.

9. A method as set forth in claim 8 wherein
    said first-recited measuring step comprises measuring the magnitude and phase of the incident wave at said one port.

10. A method as set forth in claim 8 wherein
    said first-recited measuring step comprises measuring the magnitude and phase of the reflected wave at said one port.

11. A method as set forth in claim 8 wherein
    said adjusting step comprises adjusting the magnitude and phase of the incident wave at a port to effect a short-circuit condition at one port.

12. A method as set forth in claim 8 wherein
    said adjusting step comprises adjusting the magnitude and phase of the incident wave at a port to effect an open-circuit condition at one port.

13. A method as set forth in claim 8 and comprising repeating said applying, adjusting and measuring steps with electrical signals of a second frequency different from said first-recited frequency.

14. A method of measuring the microwave parameters of a transistor or other two-port device and comprising the steps of
applying to the two ports respective electrical sinusoidal signals of the same microwave frequency,
adjusting the magnitude and phase of the signal at a port to effect a load condition of a predetermined impedance at one port,
measuring the magnitude and phase of the signal at said one port, and
measuring the magnitudes and phases of both the incident and reflected waves at the other port.

15. A method as set forth in claim 14 wherein said first-recited measuring step comprises measuring the magnitude and phase of the incident wave at said one port.

16. A method as set forth in claim 14 wherein said first-recited measuring step comprises measuring the magnitude and phase of the reflected wave at said one port.

17. A method as set forth in claim 14 wherein said adjusting step comprises adjusting the magnitude and phase of the incident wave at a port to effect a short-circuit condition at one port.

18. A method as set forth in claim 14 wherein said adjusting step comprises adjusting the magnitude and phase of the incident wave at a port to effect an open-circuit condition at one port.

19. A method as set forth in claim 14 and comprising repeating said applying, adjusting and measuring steps with electrical signals of a second frequency different from said first-recited frequency.

20. A method of measuring the electrical parameters of a transistor or other two-port device and comprising the steps of
applying to the two ports respective electrical signals of the same frequency,
adjusting the magnitude and phase of the signal at either port to effect a load condition of a predetermined impedance at one port,
measuring the magnitude and phase of either the incident wave or the reflected wave at said one port, and
measuring the magnitudes and phases of both the incident and reflected waves at the other port.

21. A method of measuring the electrical parameters of a transistor or other two-port device and comprising the steps of
applying to the two ports respective electrical signals of the same frequency,
adjusting the magnitude and phase of the signal at either port to effect either a short-circuit or open-circuit condition at one port,
measuring the magnitude and phase of the signal at said one port, and
measuring the magnitudes and phases of both the incident and reflected waves at the other port.

22. A method of measuring the microwave parameters of a transistor or other two-port device and comprising the steps of
applying to the two ports respective electrical sinusoidal signals of the same microwave frequency,
adjusting the magnitude and phase of the incident wave at a port to effect either a short-circuit or open-circuit condition at one port,
measuring the magnitude and phase of either the incident wave or the reflected wave at said one port, and
measuring the magnitudes and phases of both the incident and reflected waves at the other port.

23. A method as set forth in claim 22 and comprising repeating said applying, adjusting and measuring steps with electrical signals of a second frequency different from said first-recited frequency.

24. A method of measuring the microwave parameters of a transistor or other two-port device and comprising the steps of
applying an electrical sinusoidal signal at a microwave frequency to a port of a two-port jig adapted to have mounted thereon the two-port device to be measured but not having said device mounted thereon,
measuring the magnitudes and phases of the incident and reflected waves at said port,
applying a signal at said frequency to the other port of said jig,
measuring the magnitudes and phases of the incident and reflected waves at said other port,
short-circuiting the input port of said jig to the output port thereof,
applying a signal at said frequency to one port of said jig during said short-circuit condition,
measuring the magnitudes and phases of the incident wave at said one port and the transmitted wave at said other port,
applying a signal at said frequency to the other port of said jig during said short-circuit condition,
measuring the magnitudes and phases of the incident wave at said other port and the transmitted wave at said one port,
mounting said two-port device on said jig to connect each port of the device to a respective one of the ports of the jig,
applying signals at said frequency to the two ports of the jig simultaneously,
adjusting the magnitude and phase of the signal at a port of the jig to effect a load condition of a predetermined impedance at one port of the device,
measuring the magnitude and phase of the signal at the port of the jig connected to said one port of the device, and
measuring the magnitudes and phases of both the incident and reflected waves at the other port of the jig.

25. A method as set forth in claim 24 wherein said adjusting step comprises adjusting the magnitude and phase of the signal at a port of the jig to effect a short-circuit condition at said one port of the device.

26. A method as set forth in claim 24 wherein said adjusting step comprises adjusting the magnitude and phase of the signal at a port of the jig to effect an open-circuit condition at said one port of the device.

27. A method of measuring the microwave parameters of a transistor or other two-port device and comprising the steps of
measuring the open-circuit loss and phase shift of a microwave frequency signal at each port of a two-port jig adapted to have mounted thereon the two-port device to be measured but not having said device mounted thereon, short-circuiting the input port of said jig to the output port thereof, measuring the transfer loss and phase shift of a signal at said microwave frequency applied successively to each port of the jig and transmitted to the other port thereof, mounting said two-port device on said jig to connect each port of the device to a respective one of the ports of the jig, applying signals at said frequency to the two ports of the jig simultaneously, adjusting the magnitude and phase of the signal at a port of the jig to effect a load condition of a predetermined impedance at one port of the device, measuring the magnitude and phase of the signal at the port of the jig connected to said one port of the device, and measuring the magnitudes and phases of both the incident and reflected waves at the other port of the jig.

28. A method as set forth in claim 27 wherein
said adjusting step comprises adjusting the magnitude and phase of the signal at a port of the jig to effect a short-circuit condition at one port of the device.

29. A method as set forth in claim 27 wherein
said adjusting step comprises adjusting the magnitude and phase of the signal at a port of the jig to effect an open-circuit condition at one port of the device.

30. A method of measuring the microwave frequency parameters of a two-port device while mounted in a jig having two ports each connected to a respective one of the device ports, said method comprising the steps of
applying a signal to one port of the jig with the device removed therefrom, simultaneously therewith measuring the magnitude and phase of the electrical waves incident to and reflected from said one port of the jig to determine the conditions at said one port of the jig to effect an open-circuit at the corresponding port of the device when the latter is mounted on the jig, mounting the device on the jig with the ports of the device connected to the respective ports of the jig, applying to the ports of the jig electrical sinusoidal signals of respective magnitudes and phases to reproduce said conditions at said one port of the jig to effect an open-circuit at the corresponding port of the device, and measuring the respective magnitudes and phases of the electrical waves incident to and reflected from the other port of the jig.

31. An apparatus for measuring the electrical parameters of a transistor having two ports and comprising
means for supplying two electrical sinusoidal signals both at the same frequency, means for applying said signals respectively to the two ports, means for adjusting the magnitude and phase of the signal at a port to effect a load condition of a predetermined impedance at one port, means for measuring the magnitude and phase of the signal at said one port, and means for measuring the magnitude and phase of the signal at the other port.

32. An apparatus as set forth in claim 31 wherein
said adjusting means comprises means to effect a short-circuit condition at said one port.

33. An apparatus as set forth in claim 31 wherein
said adjusting means comprises means to effect an open-circuit condition at said one port.

34. An apparatus for measuring the microwave parameters of a transistor or other two-port device and comprising
means for supplying two electrical sinusoidal signals both at the same microwave frequency, means for applying said signals respectively to the two ports of the device, means for adjusting the magnitude and phase of the signal wave at a port to effect a load condition of a predetermined impedance at one port, means for measuring the magnitude and phase of the signal at said one port, and means for measuring the magnitudes and phases of both the incident and reflected waves at the other port.

35. An apparatus as set forth in claim 34 wherein
said adjusting means comprises means to effect a short-circuit condition at said one port.

36. An apparatus as set forth in claim 34 wherein
said adjusting means comprises means to effect an open-circuit condition at said one port.

37. An apparatus for measuring the microwave parameters of a transistor or other two-port device and comprising
means for supplying two electrical sinusoidal signals both at the same microwave frequency, means for applying said signals respectively to the two ports of the device, means for adjusting the magnitude and phase of the incident wave at a port to effect either a short-circuit or open-circuit condition at one port, means for measuring the magnitude and phase of either the incident wave or the reflected wave at said one port, and means for measuring the magnitudes and phases of both the incident and reflected waves at the other port.

38. An apparatus for measuring the high-frequency parameters of a transistor or other two-port device and comprising
a jig having two ports each adapted to be connected to a respective one of the device ports, means for applying a signal to one port of the jig with the device removed therefrom, means for measuring the magnitude and phase of the electrical waves incident to and reflected from said one port of the jig to determine the conditions at said one port of the jig to effect an open-circuit at the corresponding port of the device when the latter is mounted on the jig, means for mounting the device on the jig with the ports of the device connected to the respective ports of the jig, means for applying to the ports of the jig electrical sinusoidal signals of respective magnitudes and phases to reproduce said conditions at said one port of the jig to effect an open-circuit at the corresponding port of the device, and means for measuring the respective magnitudes and phases of the electrical waves incident to and reflected from the other port of the jig.

* * * * *